US009230604B2

(12) United States Patent
Chen et al.

(10) Patent No.: US 9,230,604 B2
(45) Date of Patent: Jan. 5, 2016

(54) VIDEO INDEXING METHOD, VIDEO INDEXING APPARATUS AND COMPUTER READABLE MEDIUM

(71) Applicant: INDUSTRIAL TECHNOLOGY RESEARCH INSTITUTE, Hsinchu (TW)

(72) Inventors: Hua-Tsung Chen, Tainan (TW); Chien-Peng Ho, Tainan (TW); Jen-Yu Yu, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 35 days.

(21) Appl. No.: 14/188,654

(22) Filed: Feb. 24, 2014

(65) Prior Publication Data

US 2015/0110466 A1 Apr. 23, 2015

(30) Foreign Application Priority Data

Oct. 21, 2013 (TW) .............................. 102137975 A

(51) Int. Cl.
| | |
|---|---|
| H04N 9/80 | (2006.01) |
| H04N 5/93 | (2006.01) |
| G11B 27/10 | (2006.01) |
| G11B 27/28 | (2006.01) |
| H04N 5/76 | (2006.01) |
| G11B 27/00 | (2006.01) |

(52) U.S. Cl.
CPC .............. *G11B 27/102* (2013.01); *G11B 27/28* (2013.01); *H04N 5/76* (2013.01)

(58) Field of Classification Search
USPC ......... 386/239, 240, 241, 243, 248, 278, 280, 386/282
See application file for complete search history.

(56) References Cited

U.S. PATENT DOCUMENTS

| | | | |
|---|---|---|---|
| 5,510,830 A | 4/1996 | Ohia et al. | |
| 5,689,611 A | 11/1997 | Ohta et al. | |
| 5,973,726 A | 10/1999 | Iijima et al. | |

(Continued)

FOREIGN PATENT DOCUMENTS

| | | |
|---|---|---|
| CN | 1367469 A | 9/2002 |
| CN | 102012932 A | 4/2011 |

(Continued)

OTHER PUBLICATIONS

Daniel Wagner et al., "Real-time Panoramic Mapping and Tracking on Mobile Phones" Virtual Reality Conference (VR), 2010 IEEE, pp. 211-218, Mar. 20, 2010.

(Continued)

*Primary Examiner* — Daquan Zhao
(74) *Attorney, Agent, or Firm* — Rabin & Berdo, P.C.

(57) ABSTRACT

A video indexing method, a video indexing apparatus, and a computer readable medium are disclosed. The video indexing apparatus comprises a generation module, a calculation module and a construction module. The generation module generates a frame movement analysis graphics according to a plurality of analysis points corresponding to a plurality of video frames of a video record. The calculation module calculates a plurality of frame movement velocities corresponding to the video frames according to the frame movement analysis graphics. The construction module constructs an indexing graphics of the video record according to the frame movement velocities.

18 Claims, 16 Drawing Sheets

(56) References Cited

U.S. PATENT DOCUMENTS

| | | | |
|---|---|---|---|
| 7,844,130 B2 | 11/2010 | Dong et al. | |
| 8,023,003 B2* | 9/2011 | Paik et al. | 348/222.1 |
| 2003/0016864 A1* | 1/2003 | McGee et al. | 382/165 |
| 2005/0063608 A1 | 3/2005 | Clarke et al. | |
| 2009/0231447 A1 | 9/2009 | Paik et al. | |
| 2011/0128374 A1 | 6/2011 | Shellshear et al. | |
| 2013/0135446 A1 | 5/2013 | Lee et al. | |
| 2015/0037000 A1* | 2/2015 | Brinkley | 386/240 |

FOREIGN PATENT DOCUMENTS

| | | |
|---|---|---|
| KR | 10-0919247 B1 | 9/2009 |
| KR | 20090097613 A | 9/2009 |
| TW | 200930099 A | 7/2009 |
| TW | 201100753 A | 1/2011 |
| TW | M410678 U | 9/2011 |
| TW | M419997 U1 | 1/2012 |
| TW | 201229958 A | 7/2012 |
| TW | 201317547 A | 5/2013 |
| TW | 201322179 A | 6/2013 |

OTHER PUBLICATIONS

Jiang Yu Zheng "Digital Route Panoramas" MultiMedia, IEEE (vol. 10, Issue 3), pp. 57-67, Jul. 2003.

Nico Cornelis et al., "Fast Compact City Modeling for Navigation Pre-Visualization" Computer Vision and Pattern Recognition, 2006 IEEE Computer Society Conference (vol. 2), pp. 1339-1344, Jun. 2006.

Dragomir Anguelov et al., "Google Street View: Capturing the World at Street Level" Computer (vol. 43, Issue 6), pp. 32-38, Jun. 2010.

Alex Rav-Acha et al., "Minimal Aspect Distortion (MAD) Mosaicing of Long Scenes" International Journal of Computer Vision, vol. 78, Issue 2-3, pp. 187-206, Oct. 2007.

Branislav Micusik et al., "Piecewise Planar City 3D Modeling from Street View Panoramic Sequences" 2009 IEEE Conference on Computer Vision and Pattern Recognition, pp. 2906-2912, Jun. 2009.

Jiang Yu Zheng "Stabilizing Route Panoramas" Proceedings of the 17th International Conference on Pattern Recognition, vol. 4, pp. 348-351, Aug. 2004.

Taiwanese Office Action dated Jul. 20, 2015.

* cited by examiner

VIDEO INDEXING METHOD, VIDEO INDEXING APPARATUS AND COMPUTER READABLE MEDIUM

This application claims the benefit of Taiwan application Serial No. 102137975, filed Oct. 21, 2013, the disclosure of which is incorporated by reference herein in its entirety.

TECHNICAL FIELD

The disclosure relates in general to a video indexing method, a video indexing apparatus, and a computer readable medium.

BACKGROUND

Along with the continual decrease in price and rapid development in the image capturing technique, mobile devices, such as smart phones, digital video recorders, and digital cameras, allowing user to generate, store and view image data have become so popular that almost everyone gets one. With a mobile device, everyone can become a producer and a user of multimedia data. In recent years, event data recorder has become an emerging mobile video recording device. Event data recorders provide effective evidence for clarifying responsibilities of an accident, and have gradually become an essential device to vehicles.

An event data recorder records whatever and whoever encountered during the trip. Therefore, whenever a traffic accident occurs, the police will collect the videos recorded by any event data recorders passing through the accident site on the same day to benefit the investigation of the accident. In general, most traffic surveillance cameras are installed near the intersections. The videos recorded in event data recorders can provide evidence for the investigation of traffic accidents not occurring near the intersections. However, adjacent video frames of original video records taken by event data recorders have high redundancy. Since the data volume is huge, a tremendous amount of labor and time would be required to check video to locate relevant segments if the huge volume of data is not appropriately processed in advance.

Mainly, there are two methods for constructing street views based on the analysis of images taken by mobile devices. The first construction method reconstructs street views with relevant images and data taken and collected by video recorders, laser devices, and GPS devices installed at transport vehicles such as SUVs, sedans, tricycles, and snowmobiles. The second construction method reconstructs street views with vertical strips continuously taken from the frames taken by video recorder installed on a lateral side of a vehicle. The second construction method is based on the assumption that the vehicle is moving at a constant speed.

SUMMARY

The disclosure is directed to a video indexing method, a video indexing apparatus, and a computer readable medium.

According to one embodiment of the disclosure, a video indexing method is disclosed. The video indexing method comprises: generating a frame movement analysis graphics according to a plurality of analysis points corresponding to a plurality of video frames of a video record; calculating a plurality of frame movement velocities corresponding to the video frames according to the frame movement analysis graphics; and constructing an indexing graphics of the video record according to the frame movement velocities.

According to another embodiment of the disclosure, a video indexing apparatus is disclosed. The video indexing apparatus comprises a generation module, a calculation module and a construction module. The generation module generates a frame movement analysis graphics according to a plurality of analysis points corresponding to a plurality of video frames of a video record. The calculation module calculates a plurality of frame movement velocities corresponding to the video frames according to the frame movement analysis graphics. The construction module constructs an indexing graphics of the video record according to the frame movement velocities.

According to an alternative embodiment of the disclosure, a computer readable medium is disclosed. The computer readable medium has a plurality of instructions which can be executed to implement a video indexing method. The video indexing method comprises: generating a frame movement analysis graphics according to a plurality of analysis points corresponding to a plurality of video frames of a video record; calculating a plurality of frame movement velocities corresponding to the video frames according to the frame movement analysis graphics; constructing an indexing graphics of the video record according to the frame movement velocities.

The above and other aspects of the disclosure will become better understood with regard to the following detailed description of the non-limiting embodiment(s). The following description is made with reference to the accompanying drawings.

Figure 1:
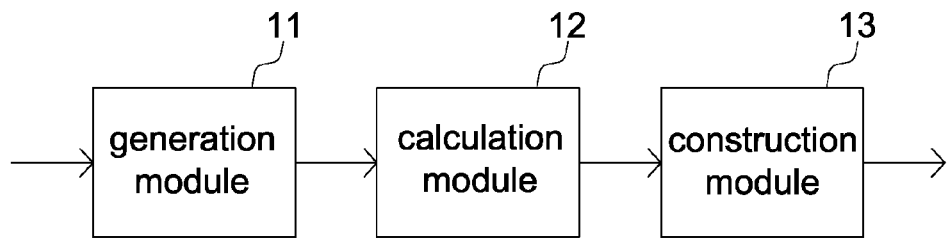
FIG. 1 is a block diagram of a video indexing apparatus according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
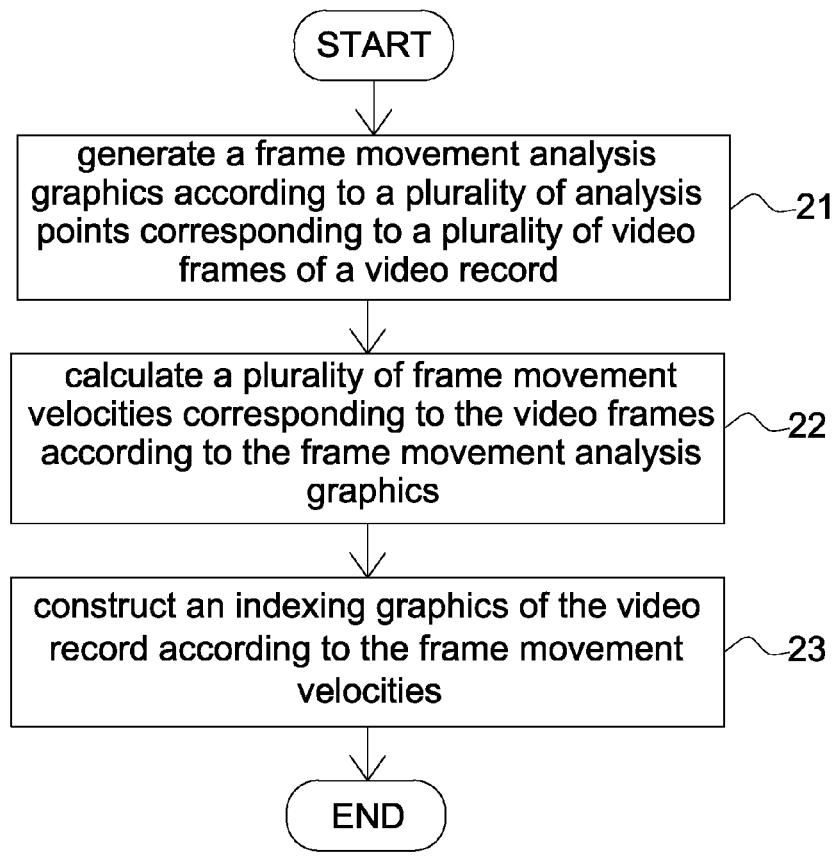
FIG. 2 is a flowchart of a video indexing method according to an embodiment of the disclosure.
Figure 3:
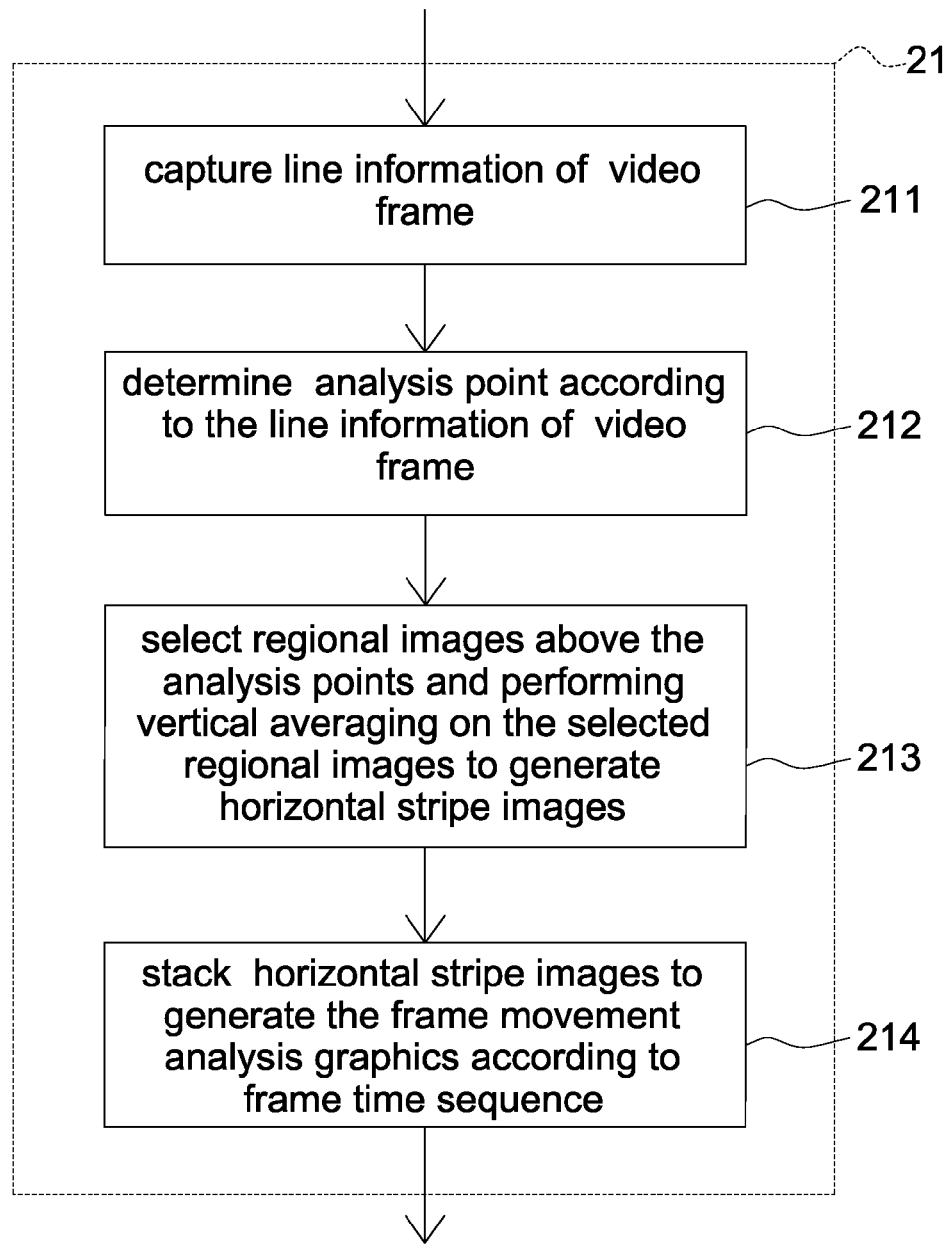
FIG. 3 is a detailed flowchart of step 21.

Referring to FIG. 1 and FIG. 2. FIG. 1 is a block diagram of a video indexing apparatus according to an embodiment of the disclosure. FIG. 2 is a flowchart of a video indexing method according to an embodiment of the disclosure. The video indexing apparatus 1 comprises a generation module 11, a calculation module 12 and a construction module 13. In an embodiment, the generation module 11, the calculation module 12 and the construction module 13 can be realized by integrated circuits. In another embodiment, the generation module 11, the calculation module 12 and the construction module 13 can be realized by at least a readable programming code read from at least a memory device by a processing unit.

The video indexing method is applicable to the video indexing apparatus 1, and comprises following steps. In step 21, the generation module 11 generates a frame movement analysis graphics according to a plurality of analysis points corresponding to a plurality of video frames of a video record. The video record is provided by such as a mobile video device, network streams or video frames of a street vehicle, wherein the video frames correspond to the analysis points respectively. The analysis points are such as vanishing points. The vanishing points are such as central points of the video frames. In step 22, the calculation module 12 calculates a plurality of frame movement velocities corresponding to the video frames according to the frame movement analysis graphics, wherein the video frames correspond to the frame movement velocities. In step 23, the construction module 13 constructs an indexing graphics of the video record according to the frame movement velocities. For instance, if the video record is about an outdoor environment, then the indexing graphics is a street view. If the video record is about an indoor environment, then the indexing graphics is an indoor landscape. The indexing graphics is helpful for the user to locate desired information from the video record.

Figure 4:
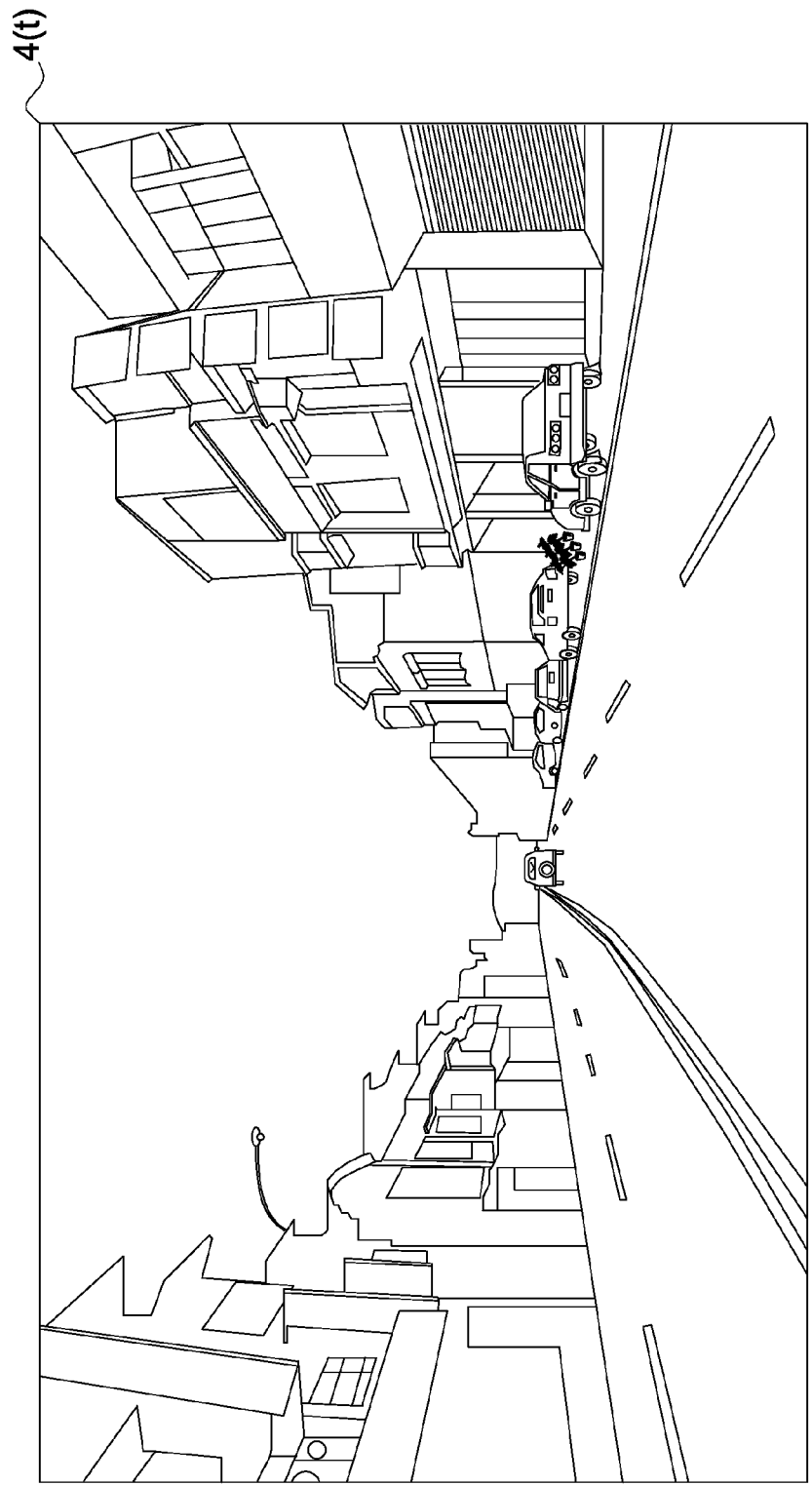
FIG. 4 is a schematic diagram of a video frame.
Figure 5:
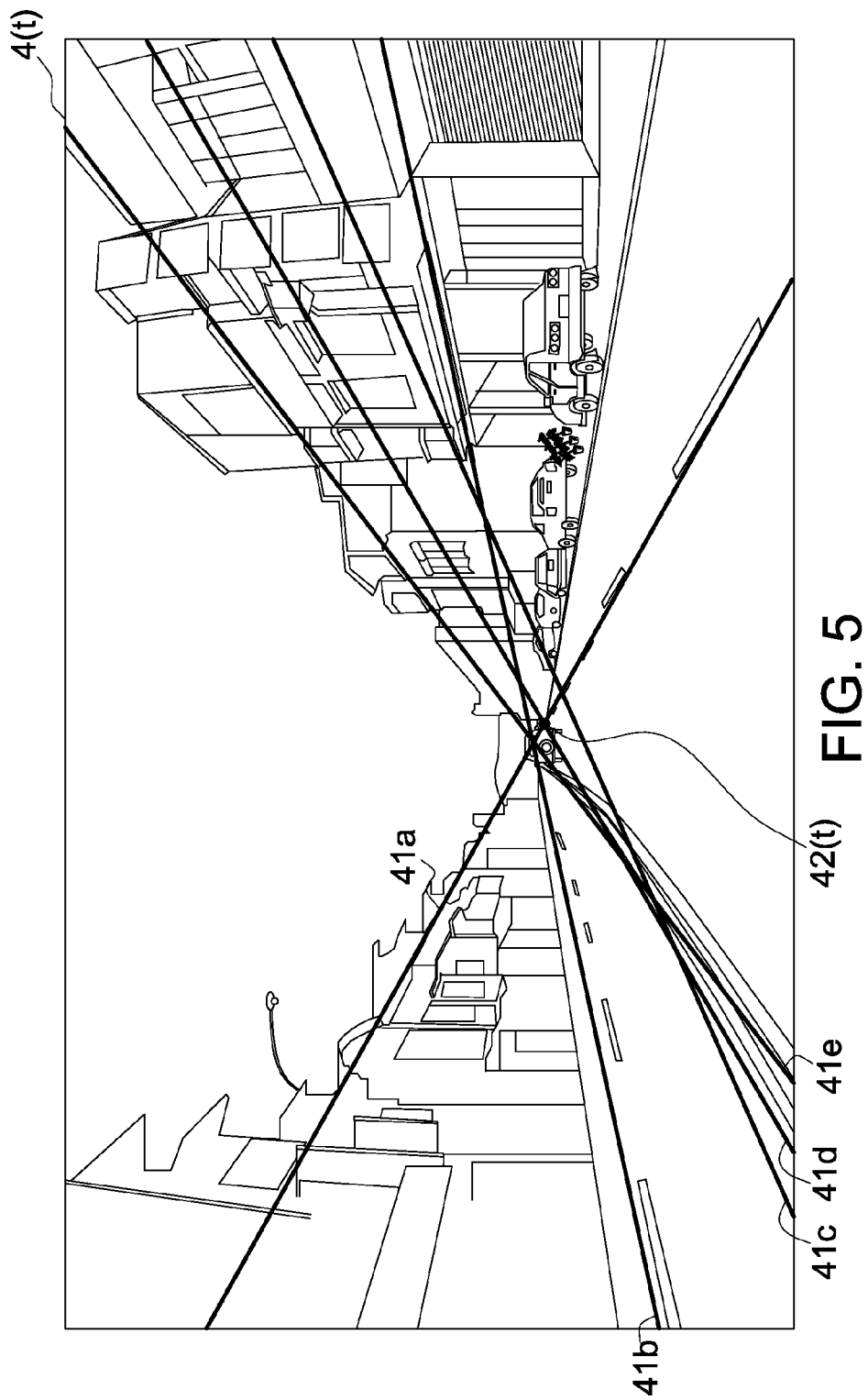
FIG. 5 is a schematic diagram of line information and analysis points of a video frame.
Figure 6:
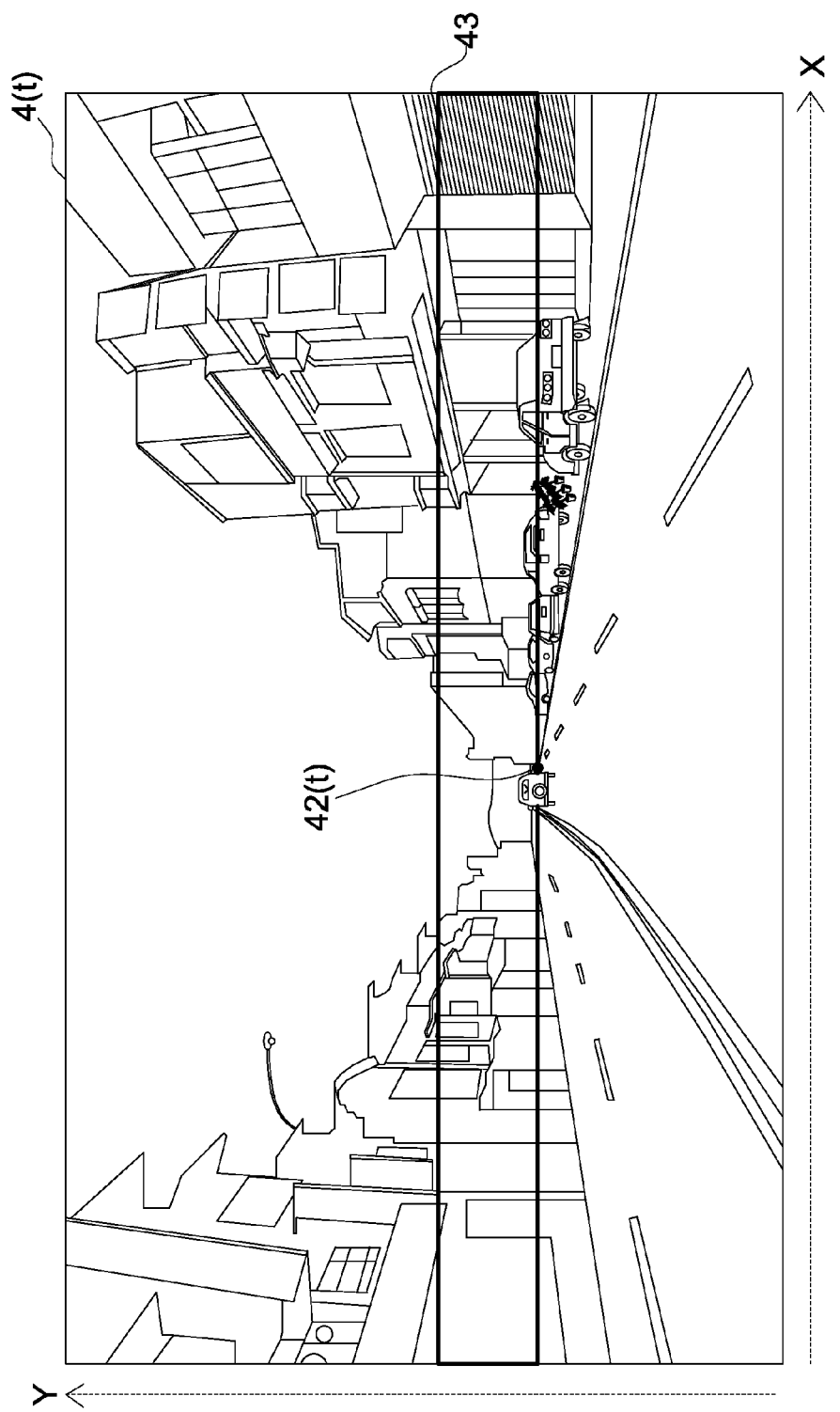
FIG. 6 is a schematic diagram of selecting an image region above an analysis point.
Figure 7:
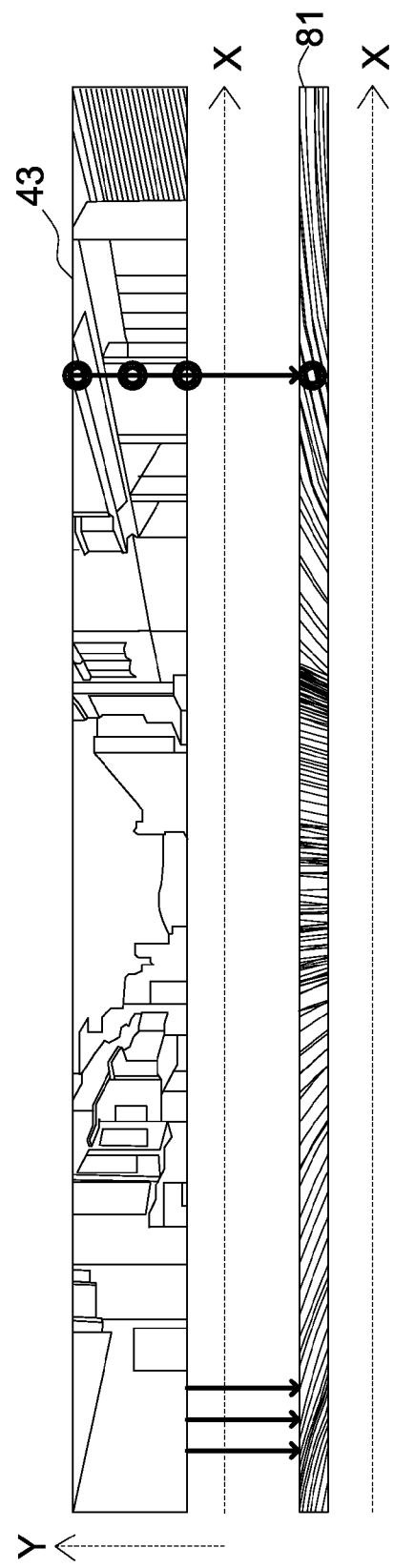
FIG. 7 is a schematic diagram of converting an image region into a horizontal stripe image.
Figure 8:
FIG. 8 is a frame movement analysis graphics.

Referring to FIG. 1, FIG. 3, FIG. 4, FIG. 5, FIG. 6, FIG. 7 and FIG. 8, FIG. 3 is a detailed flowchart of step 21. FIG. 4 is a schematic diagram of a video frame. FIG. 5 is a schematic diagram of line information and analysis points of a video frame. FIG. 6 is a schematic diagram of selecting an image region above an analysis point. FIG. 7 is a schematic diagram of converting an image region into a horizontal stripe image. FIG. 8 is a frame movement analysis graphics. Step 21 further comprises steps 211~214. In step 211, the generation module 11 captures line information of video frame 4(t), wherein the video frame 4(t) varies with frame time t. As indicated in FIG. 5, the line information of the video frame 4(t) comprises straight lines 41a~41e. In step 212, the generation module 11 determines analysis point according to the line information of video frame 4(t). As indicated in FIG. 5, the analysis point is exemplified by an analysis point 42(t). The sum of distance between the analysis point (or points) 42(t) and the straight lines 41a~41e is minimized. In step 213, the generation module 11 selects an image region 43 above the analysis point 42(t) from the video frame 4(t) and performs vertical averaging on the selected image region 43 to generate a horizontal stripe image 81 (as indicated in FIG. 6 and FIG. 7). It should be noted that since the video frame 4(t) varies with the frame time t, the generation module 11 will select a different image region 43 as the frame time t varies. The height of the image region 43 is such as 60 pixels, and the noises of the image region 43 can be filtered off by a smoothing process in step 213. In step 214, the generation module 11 stacks horizontal stripe image 81 according to the sequence of frame time t to generate a frame movement analysis graphics 8 (as indicated in FIG. 8). Since a different frame time corresponds to a different horizontal stripe image, horizontal stripe image 81 can be stacked according to the sequence of frame time t to generate the frame movement analysis graphics 8 as indicated in FIG. 8. The larger horizontal proximity the stripes of the frame movement analysis graphics 8 have, the faster the frame movement velocities are. Conversely, the larger vertical proximity the stripes of the frame movement analysis graphics 8 have, the slower the frame movement velocities are. Besides, the frame movement analysis graphics can further be generated by using motion estimation or optical flow.

Figure 9:
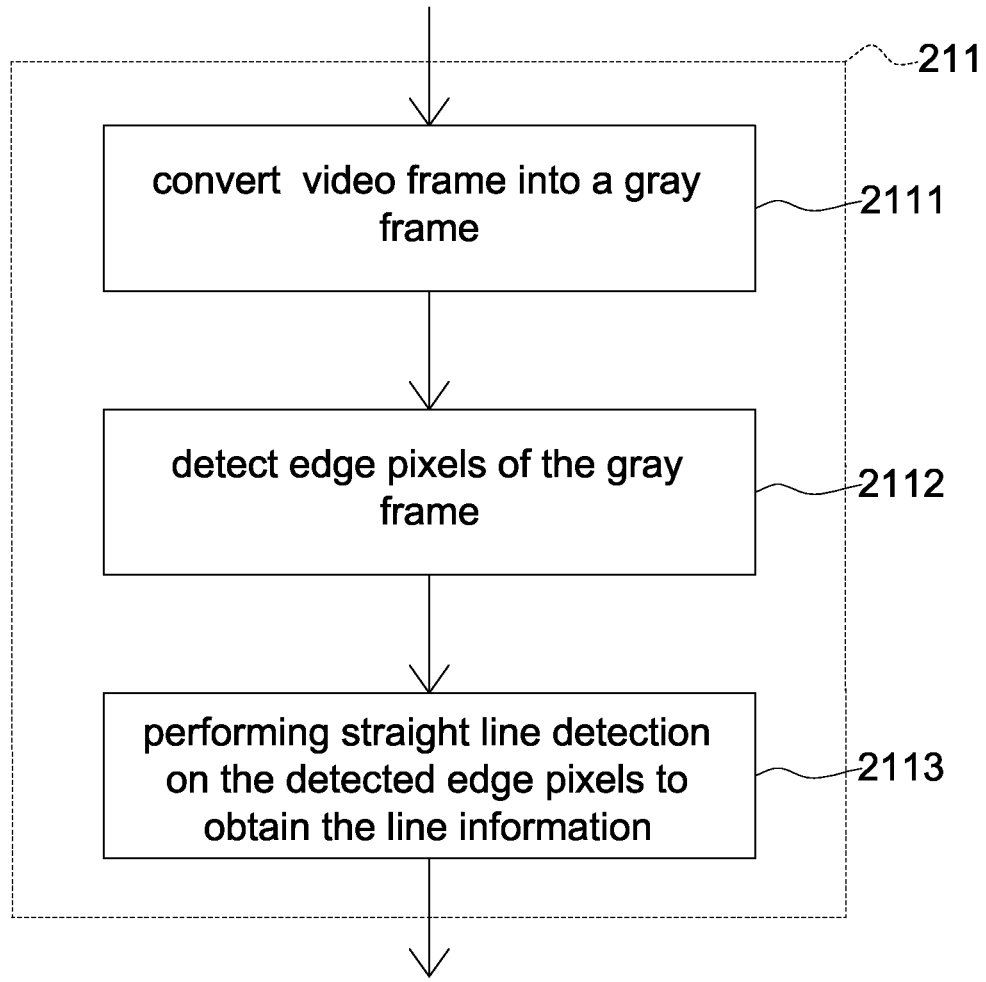
FIG. 9 is a detailed flowchart of step 211.

Referring to FIG. 1 and FIG. 9. FIG. 9 is a detailed flowchart of step 211. Step 211 further comprises steps 2111~2113. In step 2111, the generation module 11 converts video frame 4(t) into a gray frame. It should be noted that since the video frame 4(t) varies with the frame time t, the generation module 11 will generate different gray frame as the frame time t varies. Brightness Y of the gray frame can be generated by different ways exemplified below: Brightness $Y=0.212671 \times R+0.715160 \times G+0.072169 \times B$;
Brightness $Y=0.299 \times R+0.587 \times G+0.114 \times B$;
Brightness $Y=(R+G+B)/3$, etc.
Wherein, R represents a red gray value, G represents a green gray value, and B represents a blue gray value.

In step 2112, the generation module 11 detects edge pixels of a gray frame. It should be noted that since the gray frame varies with the frame time t, the generation module 11 will detect different edge pixels as the frame time t varies. In step 2113, the generation module 11 performs straight line detection on the detected edge pixels to obtain line information. For instance, the generation module 11 performs Sobel edge detection, Canny edge detection or Laplace edge detection on the gray frame to locate edge pixels. The generation module 11 binarizes the located edge pixels and then performs Hough transform, random sample consensus (RANSAC), minimum sum of squared errors or model fitting on the binarized edge pixels, and so on, to obtain line information.

Figure 10:
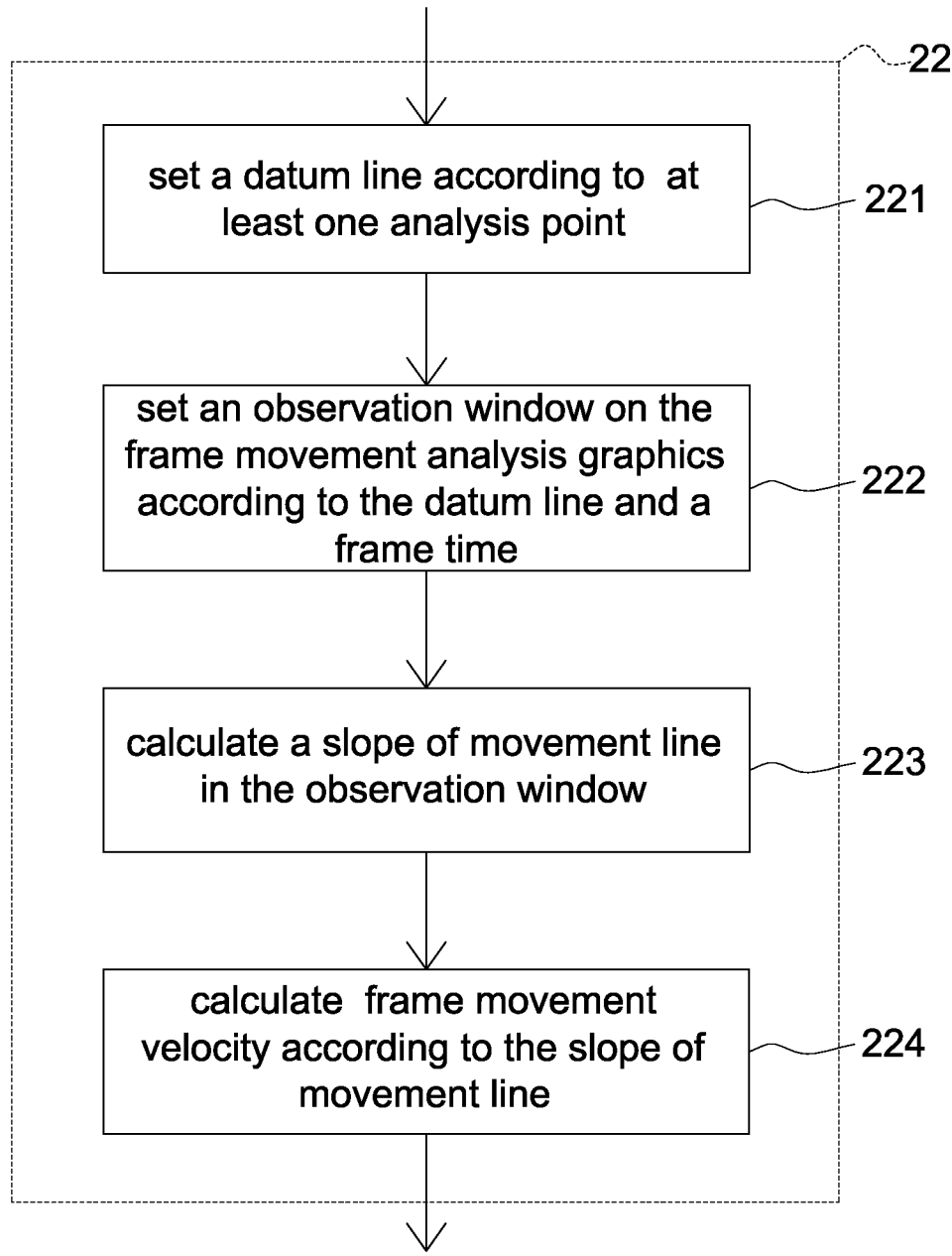
FIG. 10 is a detailed flowchart of step 22.
Figure 11:
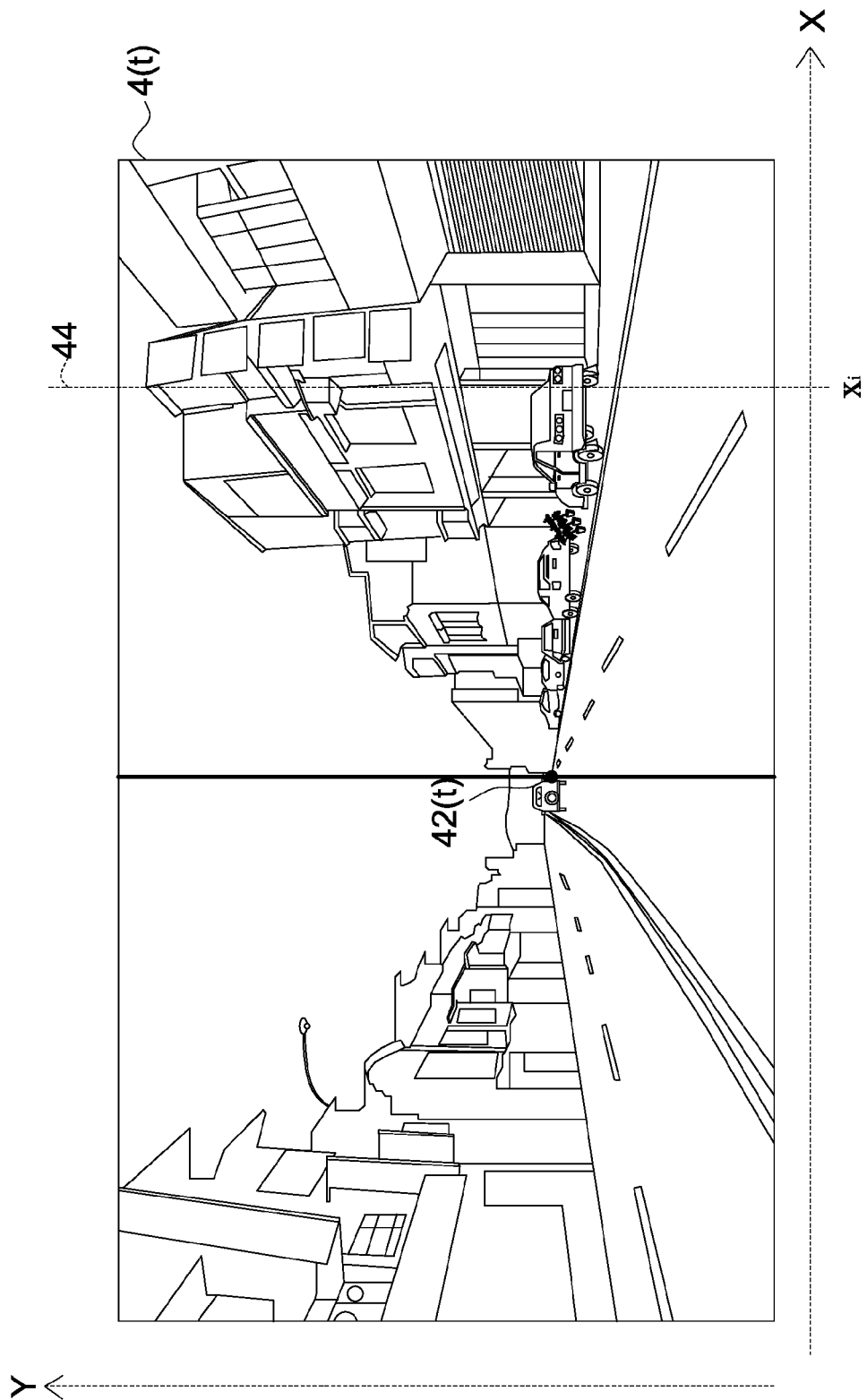
FIG. 11 is a schematic diagram of a datum line.
Figure 12:
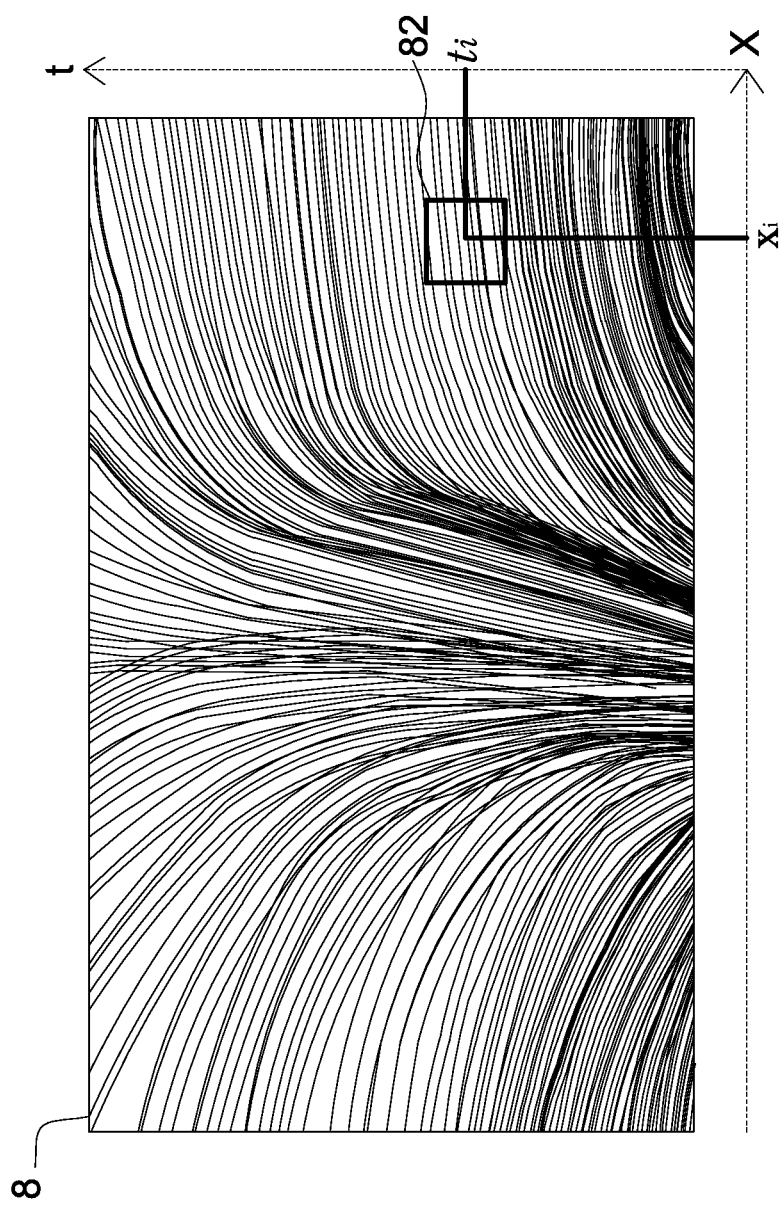
FIG. 12 is a schematic diagram of an observation window.

Referring to FIG. 1, FIG. 10, FIG. 11 and FIG. 12. FIG. 10 is a detailed flowchart of step 22. FIG. 11 is a schematic diagram of a datum line. FIG. 12 is a schematic diagram of an observation window. Step 22 further comprises steps 221~224. In step 221, the calculation module 12 sets a datum line 44 (as indicated in FIG. 11) according to at least one analysis point. The datum line 44 is located at a fixed portion of the frame to the right or the left of the analysis point 42(t). For instance, the datum line 44 is located at ⅔ of the frame to the right of the analysis point 42(t), that is, at horizontal coordinate xi as indicated in FIG. 11. In step 222, the calculation module 12 sets an observation window 82 (as indicated in FIG. 12) in the frame movement analysis graphics 8 according to the datum line 44 and a frame time ti. In step 223, the calculation module 12 calculates a slope of a movement line in the observation window 82. The slope of the movement line is such as an average or a median of the slopes of a plurality of straight lines in the observation window 82. As disclosed above, Sobel edge detection, Canny edge detection or Laplace edge detection is performed on the gray frame. In the present step, Sobel edge detection, Canny edge detection or Laplace edge detection is performed on all straight lines in the observation window 82 to locate edge pixels in advance, then the located edge pixels are binarized and Hough transform, random sample consensus (RANSAC), minimum sum of squared errors or model fitting, and so on, is performed on the binarized edge pixels to obtain line information. In step 224, the calculation module 12 calculates frame movement velocity according to the slope of the movement line. When the slope of the movement line is equal to an average of the slopes of the straight lines in the observation window 82, then the frame movement velocity is equal to an average of the slopes of the straight lines in the observation window 82.

Figure 13:
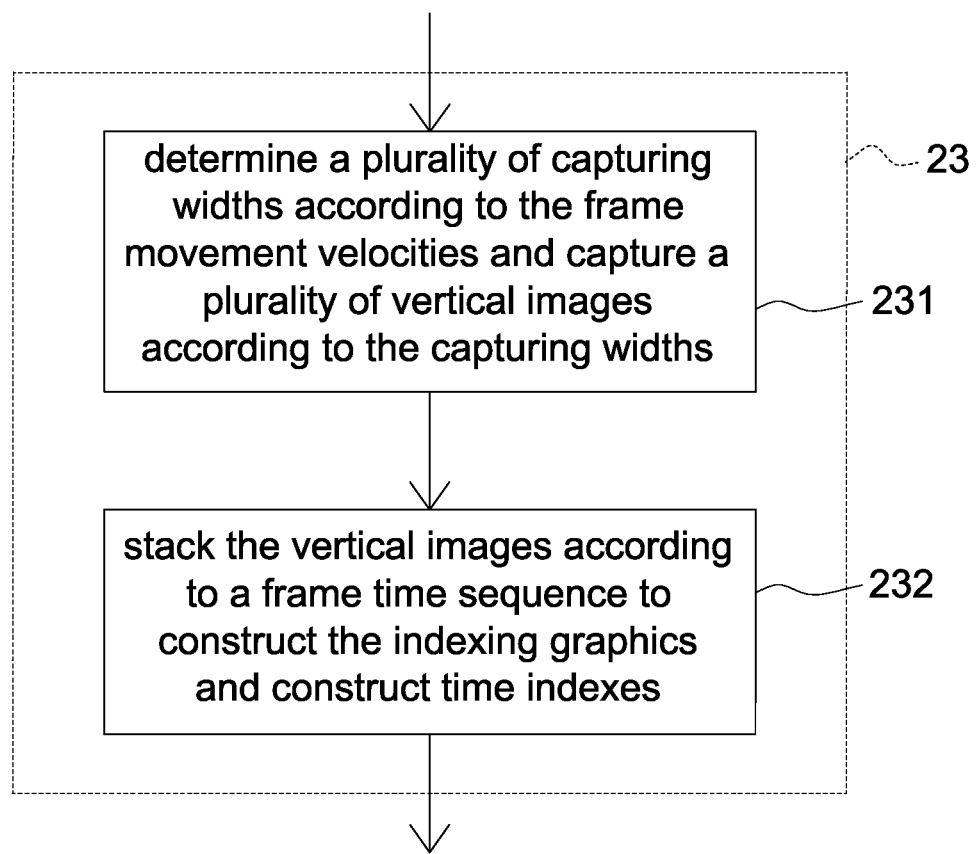
FIG. 13 is a detailed flowchart of step 23.
Figure 14:
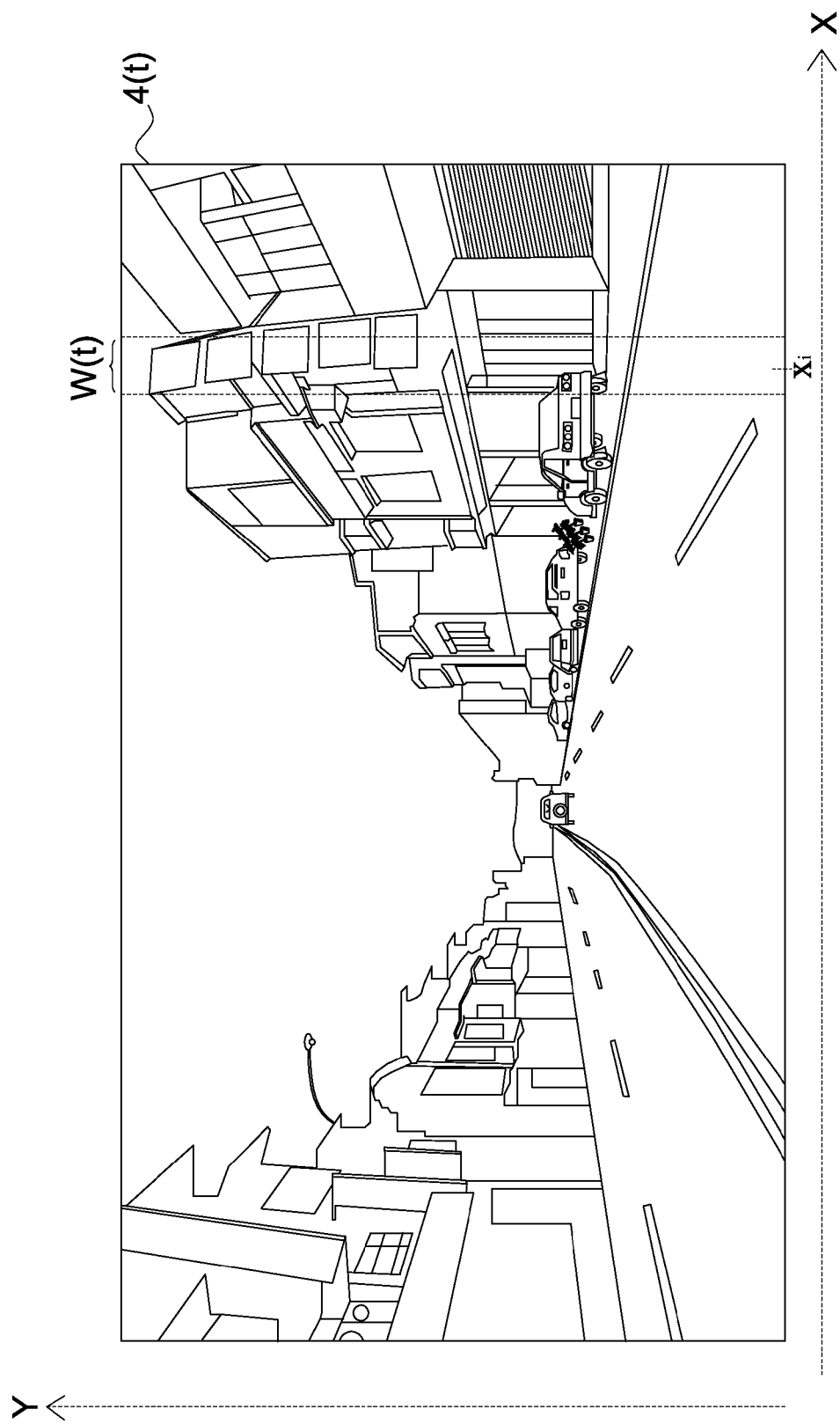
FIG. 14 is a schematic diagram of capturing a vertical image.
Figure 15:
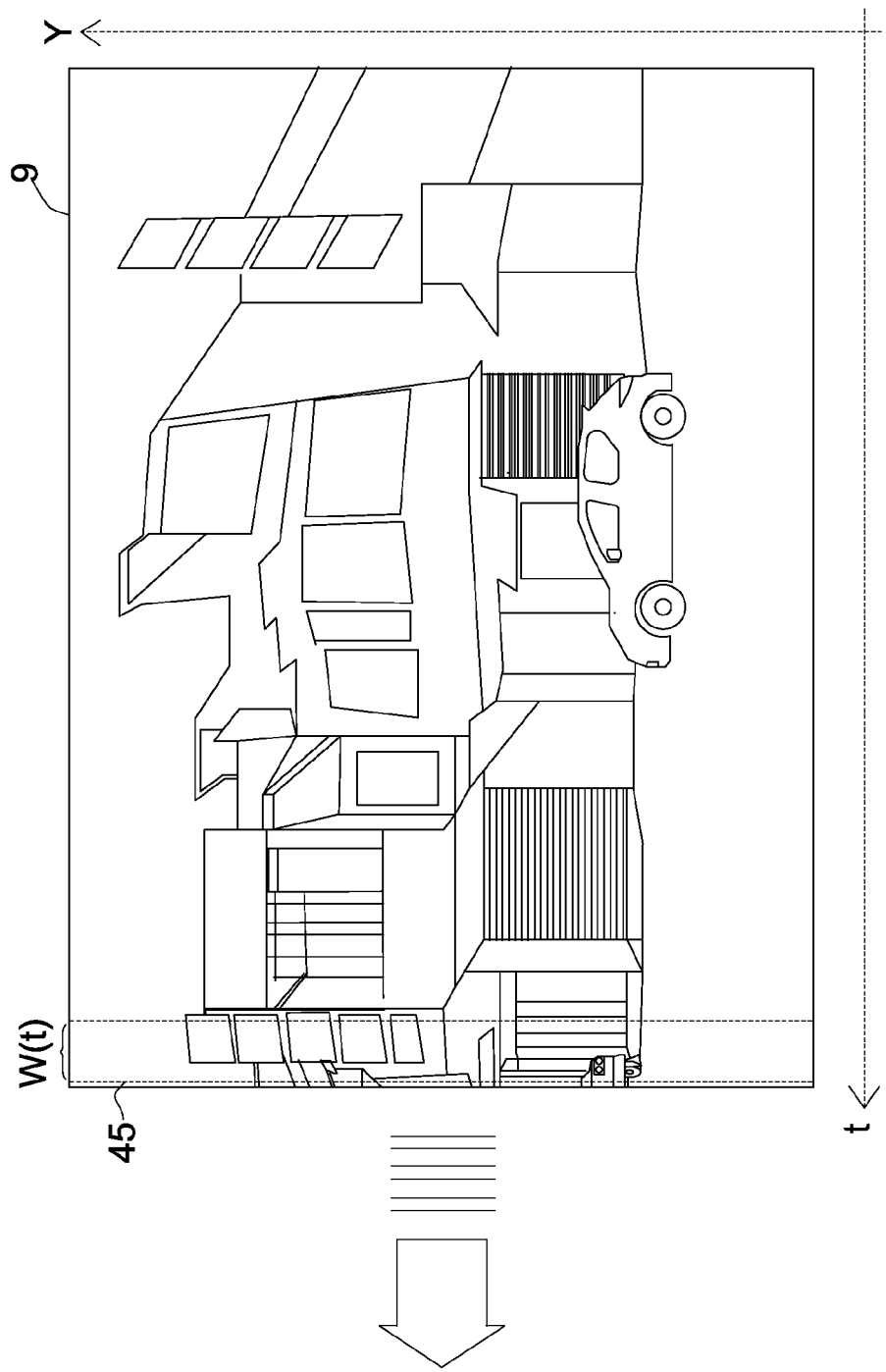
FIG. 15 is an indexing graphics schematic diagram.

Referring to FIG. 1, FIG. 13, FIG. 14 and FIG. 15. FIG. 13 is a detailed flowchart of step 23. FIG. 14 is a schematic diagram of capturing a vertical image. FIG. 15 is an indexing graphics schematic diagram. In step 231, the construction module 13 determines a capturing width W(t) according to a frame movement velocity, and captures a vertical image 45 from the video frame 4(t) according to the capturing width W(t). When the frame movement velocity gets faster, the construction module 13 sets a wider capturing width W(t). Conversely, when the frame movement velocity gets slower, the construction module 13 sets a narrower capturing width W(t). In other words, the construction module 13 determines a plurality of capturing widths W(t) according to a plurality of frame movement velocities. In addition, the construction module 13 captures a plurality of vertical images according to the plurality of capturing widths W(t). In step 232, the construction module 13 stacks vertical image 45 according to the sequence of frame time t to construct an indexing graphics 9, and construct time indexes.

Furthermore, since a different frame time corresponds to a different vertical image, an indexing graphics 9 as indicated in FIG. 15 can be obtained by stacking the vertical image 45 according to the sequence of frame time t.

Figure 16:
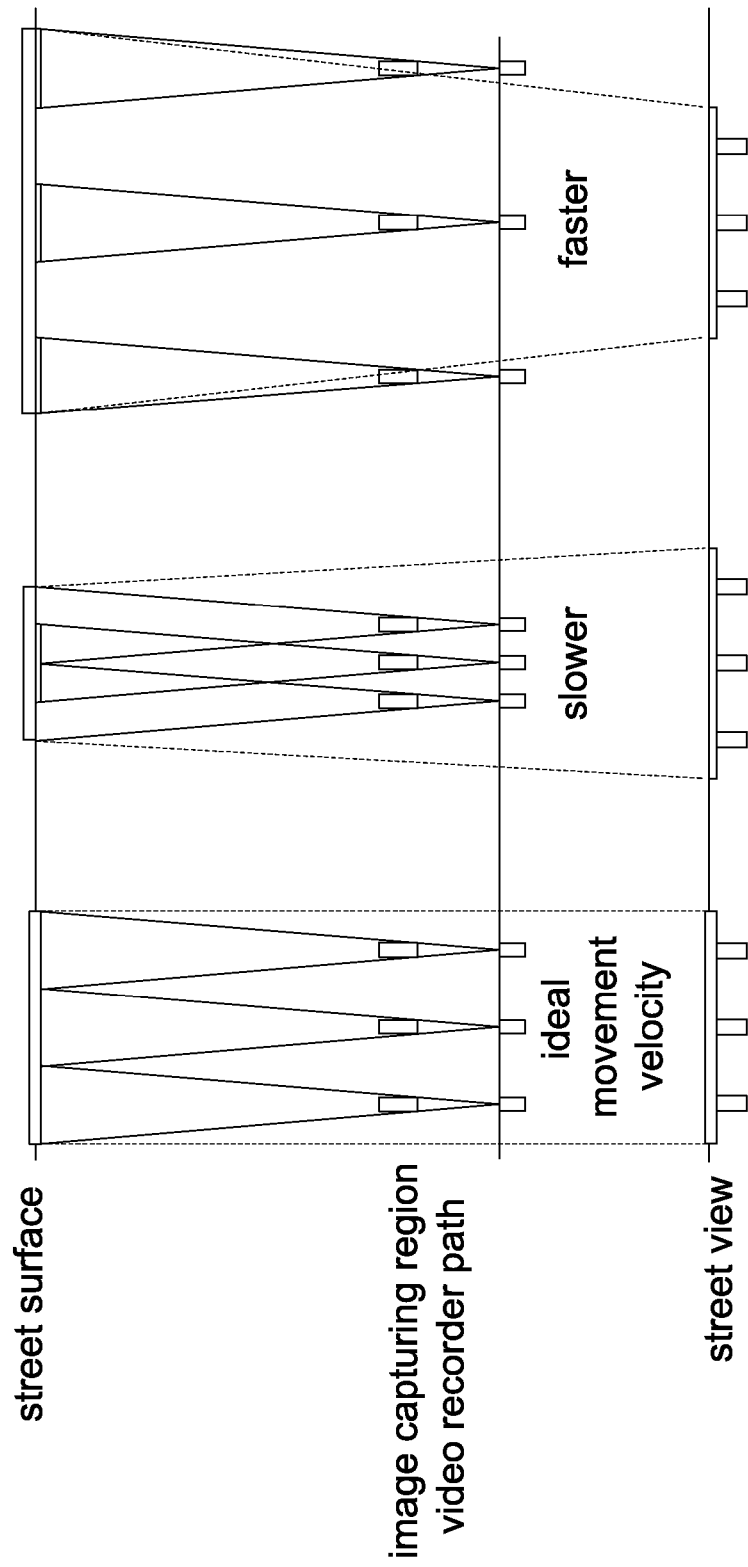
FIG. 16 is a schematic diagram of street view construction without the consideration of frame movement velocities.
Figure 17:
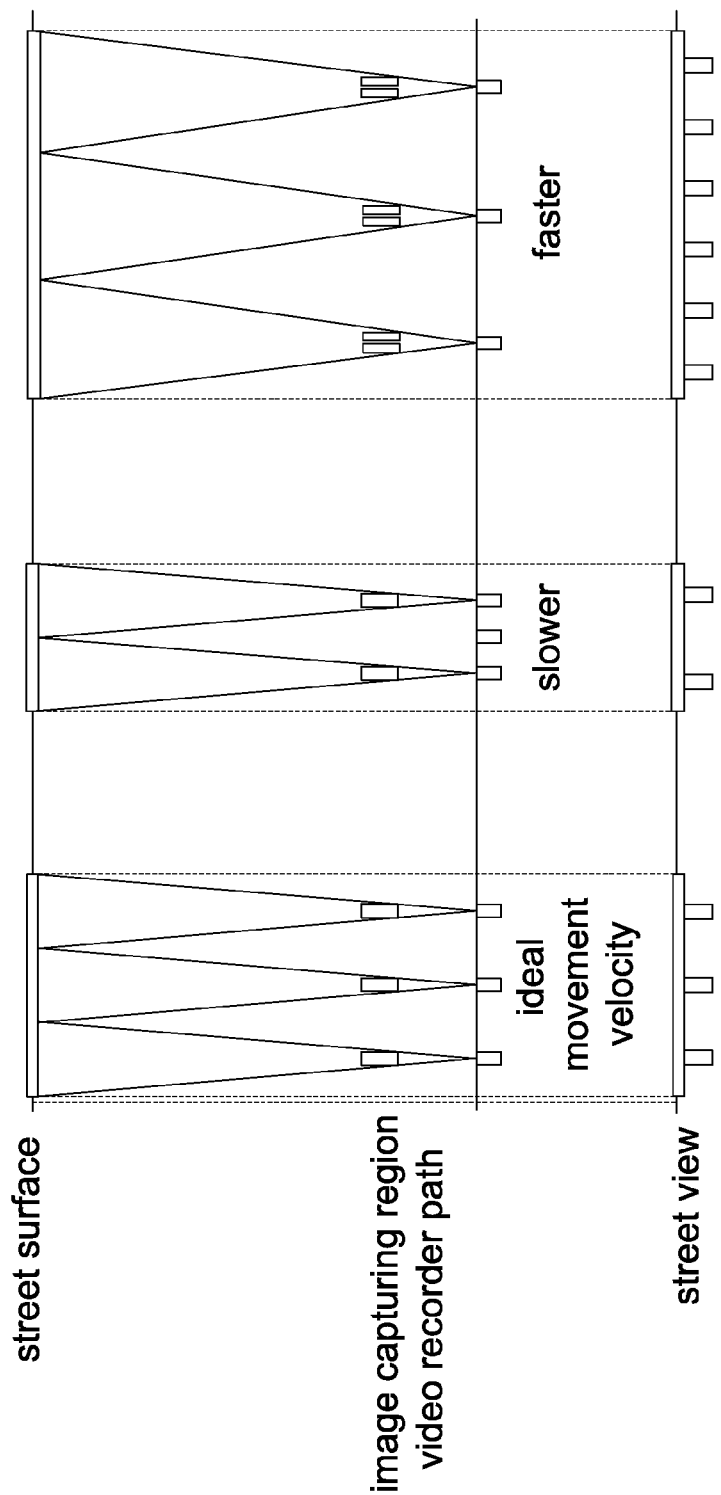
FIG. 17 is a schematic diagram of street view construction with the consideration of frame movement velocities.

Referring to FIG. 16 and FIG. 17. FIG. 16 is a schematic diagram of street view construction without the consideration of frame movement velocities. FIG. 17 is a schematic diagram of street view construction with the consideration of frame movement velocities. If the construction of a street view does not consider frame movement velocities, then the street view could not be corrected reconstructed (as indicated in FIG. 16) when frame movement velocity gets faster or slower. Conversely, if frame movement velocity is taken into consideration when the capturing width of video frame is dynamically adjusted, then the street view could be more correctly reconstructed (as indicated in FIG. 17) no matter the movement velocity gets faster or slower.

The video indexing method disclosed above can be implemented by executing instructions stored in the computer readable medium. When the computer reads instructions from the computer readable medium, the computer can execute the video indexing method. The computer readable medium is such as a floppy disc, a hard disc, a CD, a CD-read only memory (CD-ROM), a CD rewritable (CD-RW), a read only memory (ROM), random access memory (RAM), an erasable programmable read only memory (EPROM), an electrically-erasable programmable read only memory (EEPROM) or a flash memory. The computer may comprise any suitable processing platforms, devices, systems, computing platforms, devices or systems as necessary.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A video indexing method, comprising:
generating a frame movement analysis graphics according to a plurality of analysis points corresponding to a plurality of video frames of a video record;
calculating a plurality of frame movement velocities corresponding to the video frames according to the frame movement analysis graphics; and
constructing an indexing graphics of the video record according to the frame movement velocities, wherein the indexing graphics comprises a street view or an indoor landscape,
wherein the generation step comprises:
capturing line information of the video frames;
determining analysis points according to the line information of the video frames;
selecting a plurality of image regions above the analysis points from the video frames and performing vertical averaging on the selected image regions to generate a plurality of horizontal stripe images; and
stacking the horizontal stripe images to generate the frame movement analysis graphics according to sequence of frame time.

2. The video indexing method according to claim 1, wherein the line information capturing step comprises:
converting the video frames into gray frames;
detecting a plurality of edge pixels of the gray frames; and
performing straight line detection on the detected edge pixels to obtain the line information.

3. The video indexing method according to claim 1, wherein the calculation step comprises:
setting a datum line according to at least one analysis point;
setting an observation window on the frame movement analysis graphics according to the datum line and a frame time;
calculating a slope of movement line in the observation window; and
calculating each frame movement velocity according to the slope of the movement line.

4. The video indexing method according to claim 3, wherein the datum line is located at a fixed portion of the frame to the right or the left of the analysis points.

5. The video indexing method according to claim 3, wherein the slope of the movement line is an average or a median of a plurality of slopes of straight lines in the observation window.

6. The video indexing method according to claim 1, wherein the construction step comprises:
determining a plurality of capturing widths according to the frame movement velocities, and capturing a plurality of vertical images according to the capturing widths; and
stacking the vertical images according to sequence of frame time to construct the indexing graphics, and construct time indexes.

7. The video indexing method according to claim 1, wherein the line information comprises a plurality of straight lines, and sum of distance between analysis points and the straight lines is minimized.

8. The video indexing method according to claim 1, wherein analysis points are vanishing points.

9. The video indexing method according to claim 8, wherein vanishing points are central points of video frames.

10. A non-transitory computer readable medium having a plurality of instructions for executing the video indexing method according to claim 1.

11. A video indexing apparatus, comprising:
a generation module for generating a frame movement analysis graphics according to a plurality of analysis points corresponding to a plurality of video frames of a video record;
a calculation module for calculating a plurality of frame movement velocities corresponding to the video frames according to the frame movement analysis graphics; and
a construction module for constructing an indexing graphics of the video record according to the frame movement velocities, wherein the indexing graphics comprises a street view or an indoor landscape,
wherein the generation module captures line information of video frames and determines analysis point according to the line information of video frames, selects a plurality of image regions above the analysis points from the video frames and performs vertical averaging on the selected image regions to generate a plurality of horizontal stripe images, and stacks the horizontal stripe images to generate the frame movement analysis graphics according to sequence of frame time.

12. The video indexing apparatus according to claim 11, wherein the generation module converts the video frames into gray frames, detects a plurality of edge pixels of the gray frames, and performs straight line detection on the detected edge pixels to obtain the line information.

13. The video indexing apparatus according to claim 11, wherein the calculation module sets a datum line according to at least one analysis point, sets an observation window on the frame movement analysis graphics according to the datum line and a frame time, calculates a slope of movement line in the observation window, and calculates each frame movement velocity according to the slope of the movement line.

14. The video indexing apparatus according to claim 13, wherein the datum lines are located at a fixed portion of the frame to the right or the left of the analysis points.

15. The video indexing apparatus according to claim 11, wherein the construction module determines a plurality of capturing widths according to the frame movement velocities, captures a plurality of vertical image according to the capturing widths, and stacks the vertical images according to sequence of frame time to construct the indexing graphics and construct time indexes.

16. The video indexing apparatus according to claim 11, wherein the line information comprises a plurality of straight lines, and sum of distance between analysis points and the straight lines is minimized.

17. The video indexing apparatus according to claim 11, wherein the generation module, the calculation module and the construction module are realized by at least a processing unit.

18. The video indexing apparatus according to claim 11, wherein the generation module, the calculation module and the construction module are realized by integrated circuits.

* * * * *